United States Patent [19]

Shen

[11] Patent Number: 5,904,232
[45] Date of Patent: May 18, 1999

[54] CLUTCH ASSEMBLY ENABLING A FREE TURN OF AN OUTER HANDLE OF A DOOR WITH RESPECT TO A LATCH ASSEMBLY OF A LOCK

[76] Inventor: Mu-Lin Shen, No. 32, Lane 76, Sec. 5, Fu-an Rd., Tainan, Taiwan

[21] Appl. No.: 08/937,796

[22] Filed: Sep. 25, 1997

[51] Int. Cl.[6] .............................. F16D 11/04; E05B 13/10
[52] U.S. Cl. ................................. 192/69.62; 292/DIG. 27; 70/223; 70/224
[58] Field of Search .............................. 192/69.62, 69.91, 192/93 A, 114 R; 292/DIG. 27, DIG. 65; 70/221, 222, 223, 224

[56] References Cited

U.S. PATENT DOCUMENTS

| | | | |
|---|---|---|---|
| 1,787,591 | 1/1931 | Ottinger | 70/223 |
| 1,855,697 | 4/1932 | Sullivan | 70/223 |
| 1,918,411 | 7/1933 | Lowe | 70/223 |
| 3,922,896 | 12/1975 | Kagoura | 70/223 |
| 4,438,962 | 3/1984 | Soloviff et al. | 292/144 |
| 4,920,773 | 5/1990 | Surko, Jr. | 70/224 |
| 4,976,168 | 12/1990 | Lotznicker et al. | 192/114 R X |
| 5,040,652 | 8/1991 | Fish et al. | 192/71 X |
| 5,372,025 | 12/1994 | Lin | 70/223 X |
| 5,598,726 | 2/1997 | Cordle | 70/224 |
| 5,794,472 | 8/1998 | Kester et al. | 70/223 X |
| 5,816,086 | 10/1998 | Russell | 70/223 X |

*Primary Examiner*—Charles A. Marmor
*Assistant Examiner*—Scott Lund
*Attorney, Agent, or Firm*—Watson Cole Grindle Watson, P.L.L.C.

[57] ABSTRACT

A clutch assembly enabling a free turn of an outer handle of a door with respect to a latch assembly of a lock is able to allow the outer handle to rotate to open a door when the door is unlocked and to rotate freely when the door is locked, so that internal mechanism will not be damaged.

1 Claim, 5 Drawing Sheets

5,904,232

CLUTCH ASSEMBLY ENABLING A FREE TURN OF AN OUTER HANDLE OF A DOOR WITH RESPECT TO A LATCH ASSEMBLY OF A LOCK

FIELD OF THE INVENTION

The present invention generally relates to a clutch assembly, and more particularly to a clutch assembly enabling a free turn of an outer handle with respective to a latch assembly of an exit.

BACKGROUND OF THE INVENTION

Generally, a door for emergency exit is provided with an actuating device, so that a user is able to proceed a locking/unlocking process. The actuating device includes a push bar provided on an inside face of the door and an outer handle provided on an outside face of the door. The door is able to be opened either by pushing the push bar or rotating the outer handle. Once the actuating device is locked by a specific key, the outer handle will not be able to be rotated, but, the push bar is still able to be used to open the door. Thus, a user indoors is still able to open the door, yet a person outside the door is not able to open the door, when the actuating device is locked by the key. Due to this kind of actuating device being effective in the control of entrance, it is widely used in public buildings, such as theaters or apartment buildings. Although the locked outer handle does have a great effectiveness in the prevention of unauthorized entrance by certain people, some users may consciously or subconsciously rotate the outer handle trying to open the door, which often damages internal connection of the actuating device and causes a deterioration in the engagement between the actuating device and the door.

From the previous description, it is noted that to fully solve the aforementioned problems, alternatives and/or improvement(s) to the conventional actuating device of a lock are thus required. A clutch assembly enabling a free turn of an outer handle of a door with respect to a latch assembly of a lock constructed in accordance with the present invention tends to mitigate and/or obviate the aforementioned problems.

SUMMARY OF THE INVENTION

In accordance with one aspect of the invention, the main objective of the invention is to provide a clutch assembly enabling a free turn of an outer handle of a door with respect to a latch assembly of a lock. The clutch assembly is able to allow the outer handle to be rotated freely even when the lock is in a status of being locked, such that the internal connection of the lock will not be damaged.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
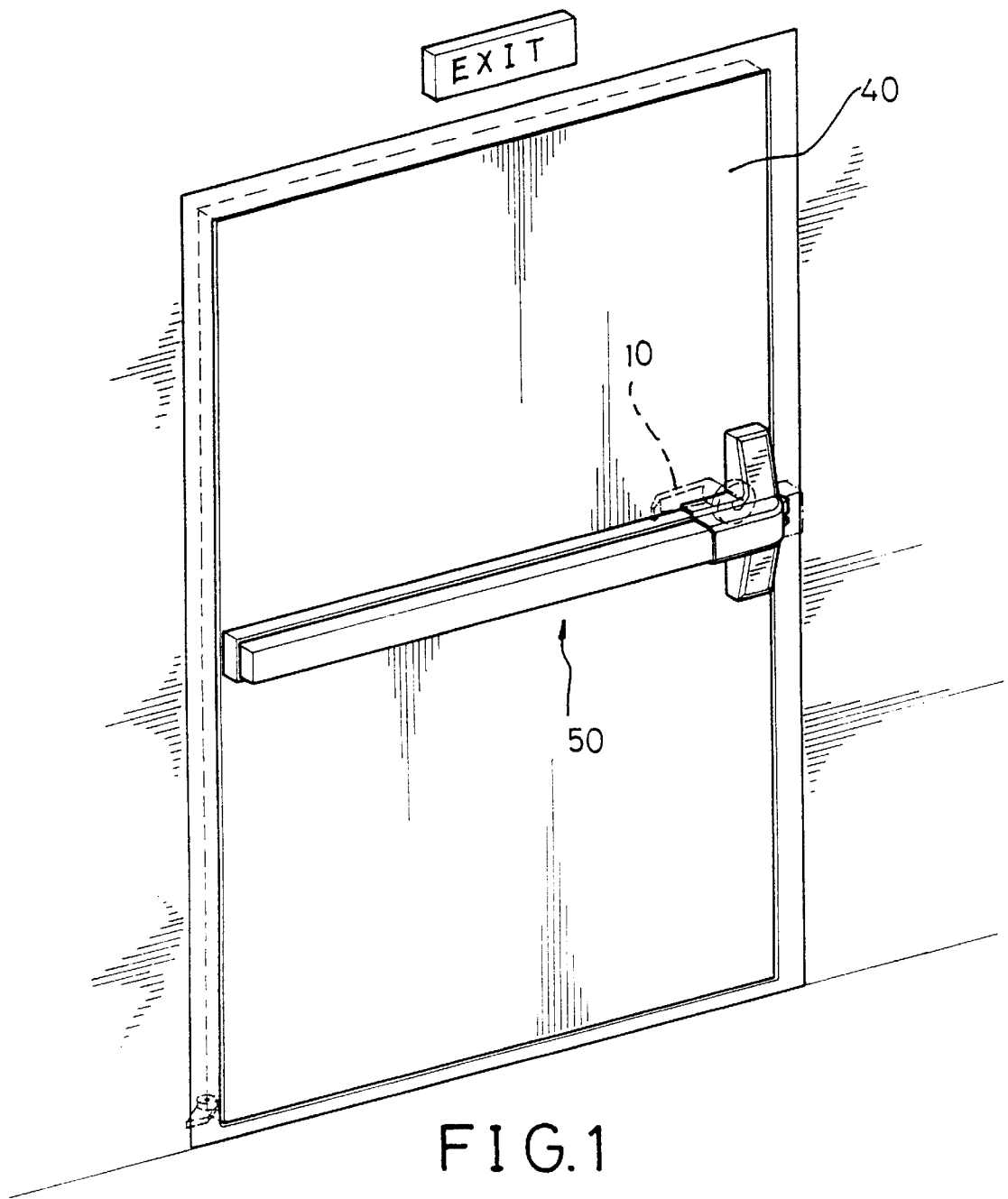
FIG. 1 is a schematic view showing a door provided with a push bar on one side and an outer handle on the other side.

Referring to FIG. 1, one preferred embodiment of a clutch assembly of a lock and constructed in accordance with the present invention is shown. The embodiment intends in descriptive purpose and not in any form to limit the scope of the present invention, such that the features of the present invention also apply to various forms of clutch assembly of a lock.

Generally, an emergency exit is provided with a door 40. The door 40 is provided with a push bar 50 inside of a room and an outer handle 10 outside of the room. Both the outer handle 10 and the push bar 50 are able to open the door 40, yet, once the door 40 is locked by using a specific key, only users using the push bar 50 are able to open the door 40. However, the outer handle 10 is still able to be freely rotated even though the door is locked, such that internal mechanism of the door 40 will not be damaged.

Figure 2:
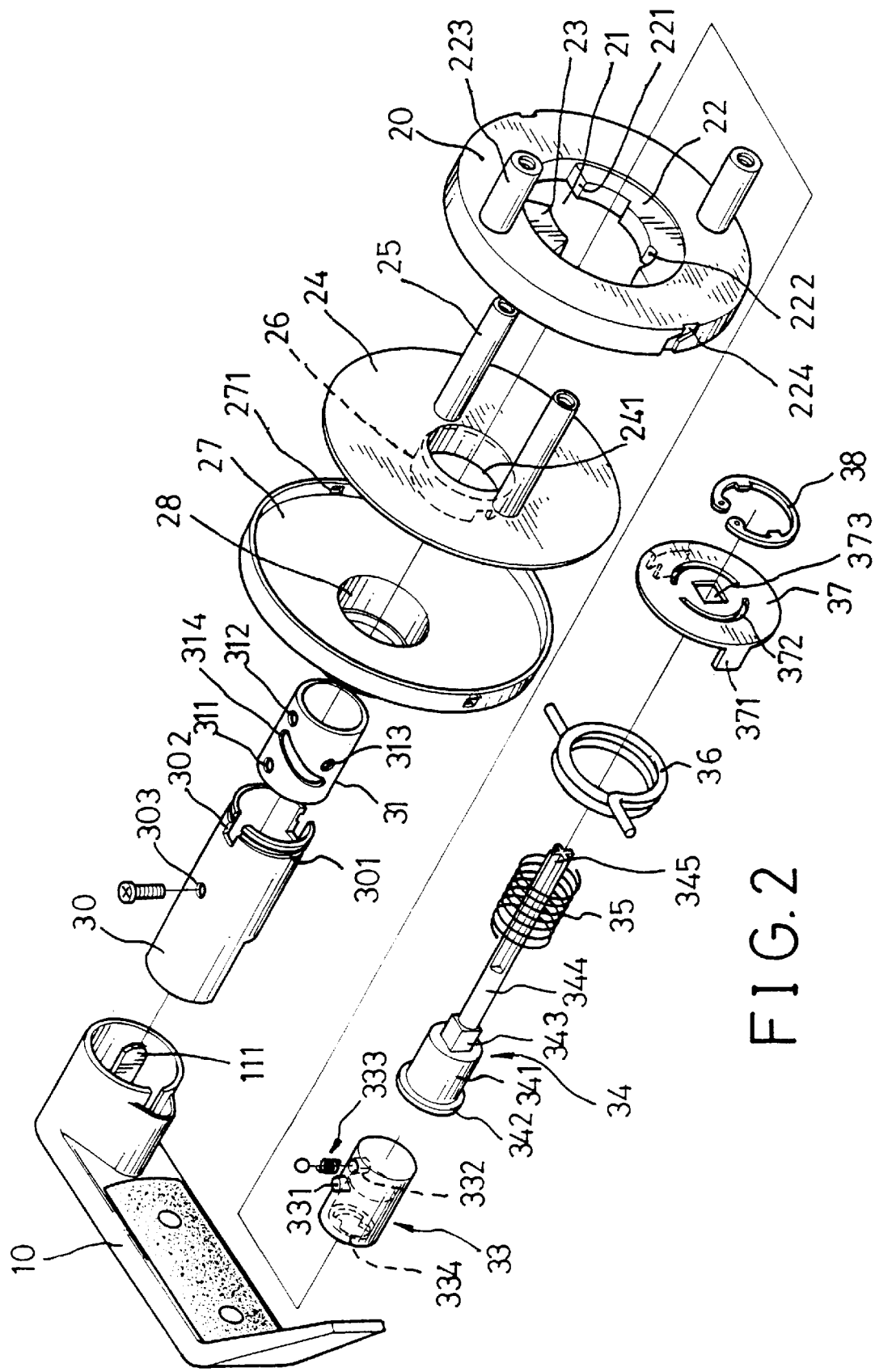
FIG. 2 is an exploded view of a latch assembly and a clutch assembly constructed in accordance with the present invention.

In the preferred embodiment of FIG. 2, the latch assembly includes an outer handle 10 of which an end thereof is a hollow cylindrical shape and provided therein is an cylinder assembly 111, a rose liner 20 defined therein a receiving space 21 and peripherally formed in the defining space 21 and a block 22 which is provided with two parallel supporting faces 221 on distal ends thereof, two spaced apart depressions 222 defined therein, two geometrically opposed studs 223, two L-shaped cutouts 224 peripherally defined therein and a stop 23 formed within the receiving space 21 and opposed to the block 22, a reinforcing liner 24 having two rods 25 diametrically opposed to the studs 223 of the rose liner 20 and extending in and out from the receiving space 21, an opening 241 centrally defined therein and a flange 26 integrally and peripherally formed from the opening 241, an outer rose cover 27 covering one side of the rose liner 20 and defining therein a central cylindrical hole 28 and having two opposed projections 271 corresponding to the zig-zag recesses 224 of the rose liner 20, whereby after insertion of each of the projections 271 into the corresponding recesses 224, each of the projections 271 is able to be securely rested within the recess 224 by a rotation of the outer rose cover, an outer spindle 30 which is hollow inserted into the outer handle 10 and having the cylinder assembly 111 received therein and defining a groove 301 peripherally defined in an end thereof, two opposed cutouts 302 defined therein and a screw hole 303 peripherally defined therein, a guiding sleeve 31 rotatably received within the outer spindle 30 and peripherally defining therein a through hole 311 allowing a screw or the like to be received therethrough via the hole 303 of the outer spindle 30 and therefore to be securely engaged therewith, two positioning holes 312, 313 and a slot 314 which is formed as a partial helix. As previously described, the outer spindle is inserted into the cylindrical end of the outer handle 10 and the guiding sleeve 31 is inserted into the outer spindle 30, thus the cylinder assembly 111 of the outer handle 10 is received within the guiding sleeve 31.

A preferred embodiment of the clutch assembly includes a control member 33 rotatably and movably received within the guiding sleeve 31 and having a concavity 332 defined therein for receiving a ball-spring combination 333 therein, a protrusion 331 integrally and peripherally formed thereon and slidably received within the slot 314 of the guiding sleeve 31 and a key hole 334 defined in an end face thereof for receiving therein the cylinder assembly 111 of the outer handle 10, a clutch member 34 having a body 341 which has integrally formed on a first end thereof a shoulder 342, a driving rod 343 securely formed on a second end thereof and an extending rod 344 having a cruciform portion 345 extending to a distal end thereof, a compression spring 35 mounted around the body 341 and rested on the shoulder 342 of the clutch member 34, a driving piece 37 centrally defining therein an opening 373 having a shape corresponding to that of the driving rod 343 for allowing the driving rod 343 to be movably received therein and having two opposed slits 372 defined therein and two wings 371 integrally extending outward, a torsion spring 36 having two opposed extending ends (not numbered) rested onto the two rods 25 extending out from the receiving space 21 and each rested onto each of the corresponding supporting faces 221 of the rose liner 20.

The outer spindle 30 is securely inserted into the cylindrical end of the outer handle 10. The guiding sleeve 31 is inserted into the outer spindle 30 and is securely attached therewith. When the assembly of the outer spindle 30, the guiding sleeve 31 and the outer handle 10 is completed, the outer spindle 30 is inserted through the cylindrical hole 28 of the outer rose cover 27, the opening 241 of the reinforcing liner 24 and the receiving space 21 of the rose liner 20, respectively, after which, the control member 33 is inserted into the guiding sleeve 31 and allow the protrusion 331 to be received within the slot 314 and the ball-spring combination to be selectively received within one of the positioning holes 312, 313. Meanwhile, the cylinder assembly of the outer handle 10 is inserted into the key hole 334 of the control member 33, so that when the outer handle 10 is rotated, and the outer spindle 30 together with the guiding sleeve 31 will also be driven to rotate, thus the control member 33 will have a horizontal displacement due to the confinement of the protrusion 331 by the slot 314. Then, the compression spring is mounted around the body 341 and rested on the shoulder 342 of the clutch member 34. One end of the outer spindle 30 and has the groove 301 peripherally defined therein is inserted into the corresponding slit 372 and the driving rod 343 is inserted into the opening 373 of the driving piece 37, then a c-ring 38 is securely mounted in the groove 301 to prevent the clutch member 34 from losing engagement with the outer spindle 30 and provide a pressure to the compression spring 35 to maintain a force applied on the clutch member 34 inclining to withdraw the driving rod 343 from the opening 373 of the driving piece 37.

Figure 3:
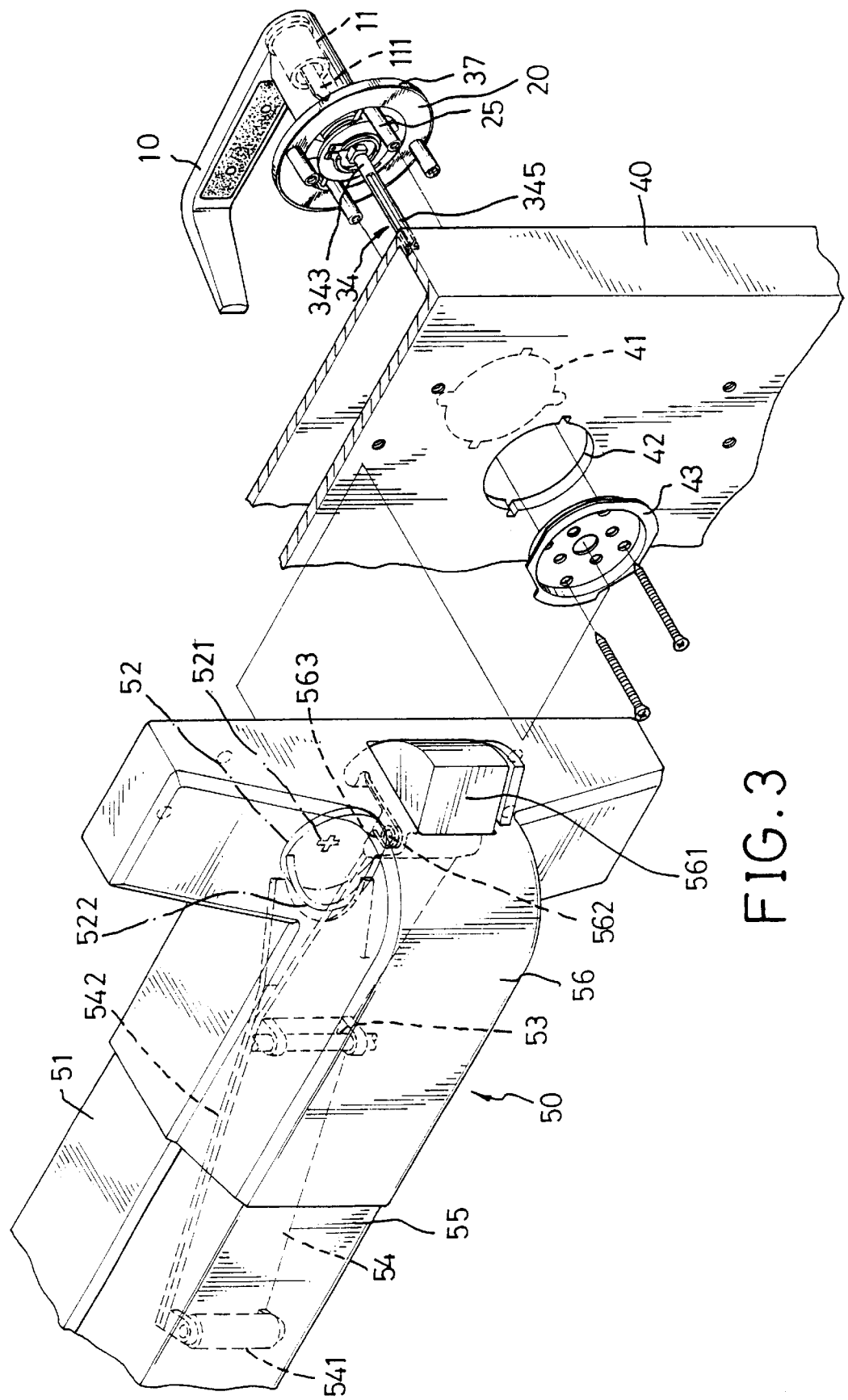
FIG. 3 is a partial enlargement of the clutch assembly incorporated with the door.

Referring to FIG. 3, a base 51 of the push bar 50 is securely mounted on the door 40. A first end of a plate 54 is provided with a pivot bearing 541, a second end of which is, via a pivot 53, abutted to a portion of a tongue 561 pivotally mounted on an axle 562 and the tongue 531 is received within a cover 56. A spring 563 securely abutted between an inner face of the tongue 561 and an inner face (not numbered) of the cover 56 is also mounted around the axle 562, such that when a pressing portion 55 of the push bar 50 is pressed, the second end of the plate 54 is able to activate the tongue 561 and thus open the door. Meanwhile, a cross hole 521 defined in a disk 52 mounted on the door 40 is able to allow the cross head 345 of the clutch member 34 to be inserted therein, such that when the cross head 345 is rotated, an arc portion 522 of the disc 52 is also able to drive a driving plate 542 and consequently open the door 40.

Figure 4:
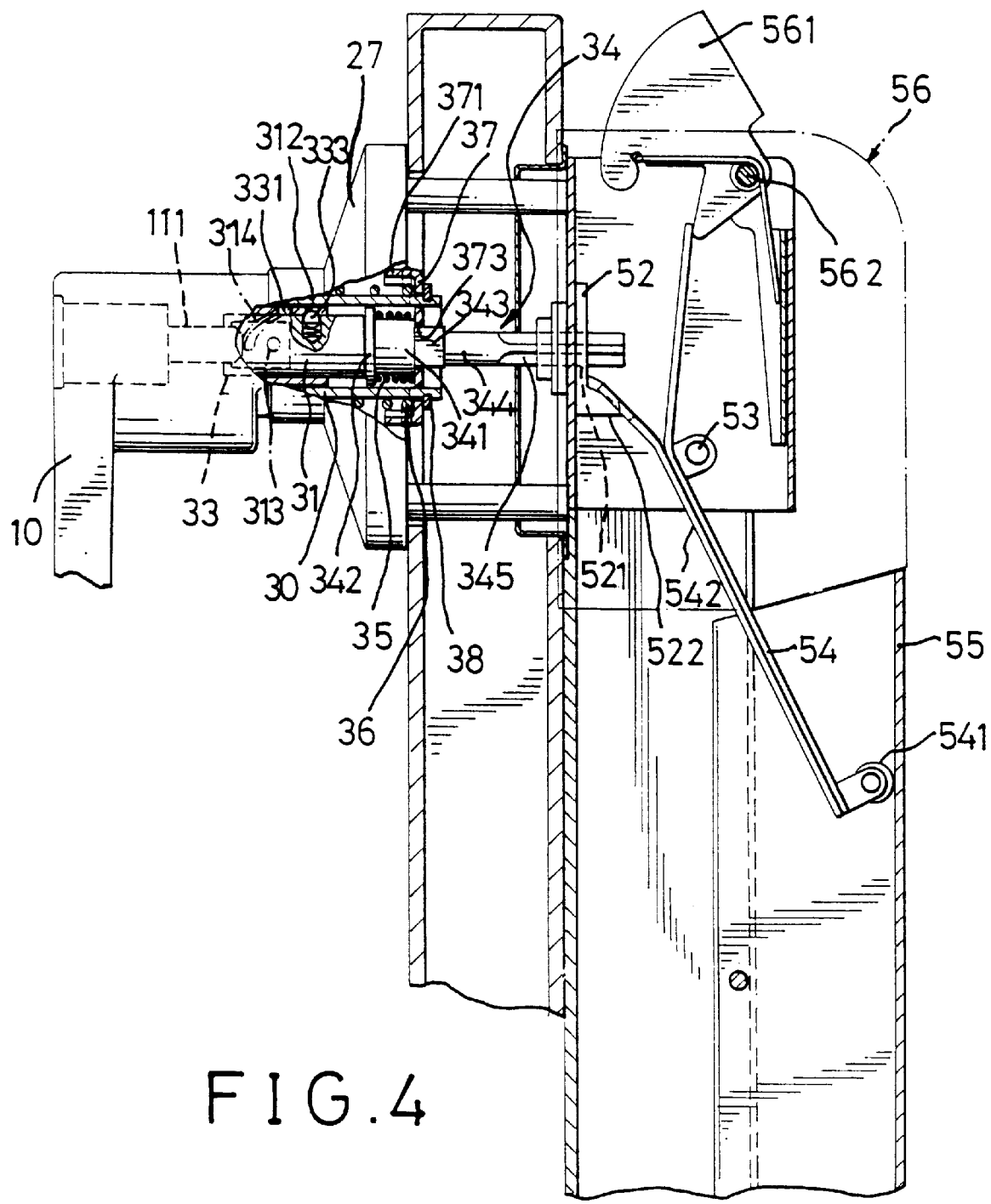
FIG. 4 is a sectional view showing the relationship between the clutch assembly and the door.
Figure 5:
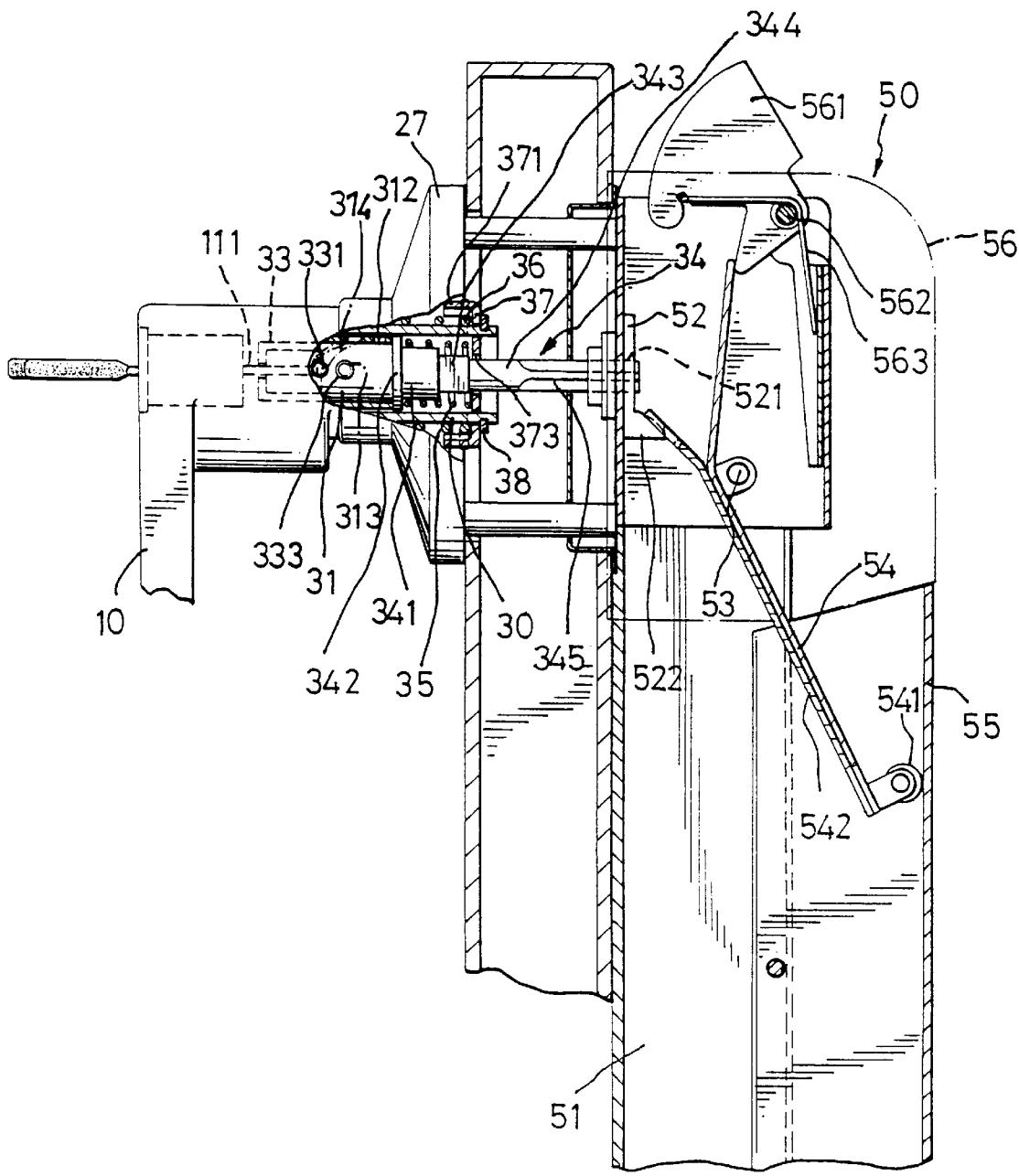
FIG. 5 is a sectional view showing a consequence of a displacement caused by a rotation of a specific key of the control member.

Referring to FIGS. 4 and 5, when the door 40 is unlocked, the ball-spring combination 333 received within the concavity 332 is biased against the positioning hole 312, and the driving rod 343 is securely received within the opening 373 of the driving piece, such that when a user rotates the outer handle 10, the rotation of the outer spindle 30 will also drive the driving piece 37 to rotate and therefore the cross head 345 of the clutch member 34 will rotate the disk 52. Consequently, the rotation of the disk 52 will then via the arc portion 522 drive the driving plate 542 to activate the tongue 561 and thus open the door 40.

When the door 40 is locked by a specific key (not numbered), a rotation of the key will drive the cylinder assembly 111 to rotate accordingly. The cylinder assembly 111 of the outer handle 10 is inserted into the key hole 334 of the control member 33, such that a rotation of the cylinder assembly 111 will also rotate the control member 34. Thus, as previously stated, when the control member 33 is rotated, the ball-spring combination 333 will be driven to move to the positioning hole 313 and the control member 33 will have a horizontal displacement due to the confinement of the protrusion 331 by the slot 314 of the outer spindle 30. Therefore, a retrogression of the control member 33 will create a space. Because the clutch member 34 is constantly biased by the compression spring 35, the clutch member 34 will then be moved to the space and the driving rod 343 will thus leave the confinement of the opening 373 of the driving piece 37. Thereafter, the rotation of the of the outer handle 10 will not drive the cross head 345 to rotate, and thus the arc portion 522 of the disk 52 will not be able to activate the driving plate 542 and the tongue 561 subsequently. Therefore, when the door 40 is locked, the outer handle 10 is still able to be rotated, but the tongue 561 will not be activated to open the door, thus, internal mechanism of the door and the lock is protected from being damaged.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A clutch assembly enabling a free turn of an outer handle with respective to a latch assembly of a lock comprising:

a guiding sleeve mounted in a fixed relationship with respect to said outer handle and having a slot and a pair of positioning holes defined therein;

a control member rotatably and movably received within said guiding sleeve and having a concavity defined therein for receiving a ball-spring combination therein, a protrusion integrally and peripherally formed thereon and slidably received within the slot of the guiding sleeve, and a key hole defined in an end face thereof for receiving therein a portion of said outer handle;

a clutch member having a body with a shoulder integrally formed on a first end thereof, a driving rod securely formed on a second end thereof, and an extending rod having a cruciform portion extending to a distal end thereof;

a compression spring mounted about the body and resting on the shoulder of the clutch member; and a driving piece centrally defining therein an opening for corresponding to the driving rod for allowing the driving rod to be movably received therein and having two opposed slits defined therein and two wings integrally extending outwardly;

said compression spring being abutted between said driving piece and said shoulder of said clutch member; and said ball-spring combination releasably retaining said control member at a first position where said driving rod engages with said driving piece and a second position where said driving rod disengages from said driving piece.

* * * * *